United States Patent [19]

Okino

[11] Patent Number: 5,398,065
[45] Date of Patent: Mar. 14, 1995

[54] IMAGE SENSING DEVICE

[75] Inventor: Tadashi Okino, Tokyo, Japan

[73] Assignee: Canon Kabushiki Kaisha, Tokyo, Japan

[21] Appl. No.: 125,435

[22] Filed: Sep. 22, 1993

Related U.S. Application Data

[63] Continuation of Ser. No. 911,244, Jul. 6, 1992, abandoned, which is a continuation of Ser. No. 729,795, Jul. 10, 1991, abandoned, which is a continuation of Ser. No. 474,215, Feb. 1, 1990, abandoned, which is a continuation of Ser. No. 554,840, Nov. 23, 1983, abandoned.

[30] Foreign Application Priority Data

Nov. 29, 1982 [JP] Japan ................ 57-208920
Sep. 5, 1983 [JP] Japan ................ 58-162806

[51] Int. Cl.[6] ............................ H04N 5/225
[52] U.S. Cl. ............................ 348/371; 348/262
[58] Field of Search ............ 348/207, 211, 371, 262, 348/222, 229; 354/413, 418, 420; H04N 5/335

[56] References Cited

U.S. PATENT DOCUMENTS

| | | | |
|---|---|---|---|
| 3,637,937 | 1/1972 | Deveson | 358/174 |
| 3,651,255 | 3/1972 | Kubota et al. | 358/221 |
| 3,748,383 | 7/1973 | Grossman | 358/113 |
| 4,050,085 | 9/1977 | Prince | 358/219 |
| 4,495,520 | 1/1985 | Kravitz | 358/219 |
| 4,499,487 | 2/1985 | Takayama | 358/41 |
| 4,509,077 | 4/1985 | Therrien | 358/139 |
| 4,525,741 | 6/1985 | Chahal | 358/174 |
| 4,532,918 | 8/1985 | Wheeler | 358/168 |
| 4,564,856 | 1/1986 | Sanderson | 358/168 |
| 4,567,509 | 1/1986 | Takayama | 359/29 |
| 4,589,023 | 5/1986 | Suzuki | 358/213.13 |
| 4,635,126 | 1/1987 | Kinoshita | 358/213.19 |
| 4,677,489 | 6/1987 | Nishimura | 358/225 |

FOREIGN PATENT DOCUMENTS

| | | | |
|---|---|---|---|
| 2007905 | 11/1970 | Germany . | |
| 3147567 | 6/1982 | Germany . | |
| 5646364 | 9/1979 | Japan . | |
| 5796422 | 12/1980 | Japan . | |
| 145484 | 9/1982 | Japan | 358/174 |
| 147382 | 9/1982 | Japan | 358/174 |
| 51670 | 3/1983 | Japan | 358/174 |

OTHER PUBLICATIONS

Camera Technical Handbook, Shashin Kogyo Shuppan-sha, Jul. 15, 1979 Color Video Camera & How to Use, Masakazu Hara, Japan Broadcasting Corp.

Primary Examiner—Joseph Mancuso
Assistant Examiner—Tuan V Ho
Attorney, Agent, or Firm—Anderson Kill Olick & Oshinsky

[57] ABSTRACT

In an image sensing device having an image sensor which converts the image of an object to be photographed into an electrical signal and an automatic gain control circuit which automatically controls the gain of the electrical signal, the operation of the automatic gain control circuit is limited according to the mode selected from various special photographic modes.

31 Claims, 4 Drawing Sheets

IMAGE SENSING DEVICE

This is a continuation application of Ser. No. 07/911,244, filed Jul. 6, 1992, now abandoned; which in turn is a continuation application of Ser. No. 07/729,795, filed Jul. 10, 1991, now abandoned; which in turn is a continuation application of Ser. No. 07/729,795, filed Feb. 1, 1990, now abandoned; which in turn is a continuation application of Ser. No. 06/554,840, filed Nov. 23, 1983, now abandoned.

BACKGROUND OF THE INVENTION

1. Field of the Invention

This invention relates to an image sensing device which converts the image of an object to be photographed into an electrical signal by means of an image sensor such as an image tube or a charge coupled device (CCD).

2. Description of the Prior Art

In the conventional image sensing devices of the kind using a camera tube or a CCD as an image sensor, the dynamic range of the image sensor is very narrow. The output level of the image sensor, therefore varies to a great extent even for a slight exposure deviation. To electrically correct this variation, an automatic gain control circuit (hereinafter called AGC) has heretofore been arranged to keep the level of a signal which is to be transmitted to a signal processing circuit and a recording circuit nearly constant irrespective of the magnitude of the output of the image sensor. However, in a device of this kind, it is impossible to store exposure information (AE lock) or to correct an exposure for a backlighted subject because the AGC negates the variations of the output level of the image sensor. Furthermore, conventional devices cannot cope with cases where an exposure condition at the time of photographing changes completely from the previously existing light measurement condition as flash photography.

SUMMARY OF THE INVENTION

The present invention is directed to the elimination of the above-stated shortcomings of conventional devices. It is therefore an object of the invention to provide an image sensing device which always permits the photographer to obtain a photograph correctly reflecting what is intended even in the cases of exposure corrected photography and flash photography. More specifically, the object of the invention is to provide an image sensing device in which the operation of an automatic gain control circuit (AGC) is limited according to the mode selected from various special photographing modes.

It is another object of the invention to provide an image sensing device in which information on an exposure is stored; the gain of an AGC obtained at the time of storing the exposure information is retained; and, when photographing is to be carried out on the stored information, the photographing operation is carried out with this gain.

It is a further object of the invention to provide an image sensing device which performs a photographing operation by varying the gain of an AGC in the case of exposure corrected photographing.

It is a still further object of the invention to provide an image sensing device which performs a photographing operation by fixing the gain of an AGC at a predetermined value in the case of flash photography.

It is among the objects of the invention to provide an image sensing device wherein the gain of an AGC is fixed at a predetermined value for flash photography and the gain is corrected in case that the quantity of reflected flash light differs from an anticipated value.

It is also among the objects of the invention to provide a flash device which is to be used in combination with an image sensing device and produces a signal arranged to control the gain of the image sensing device.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
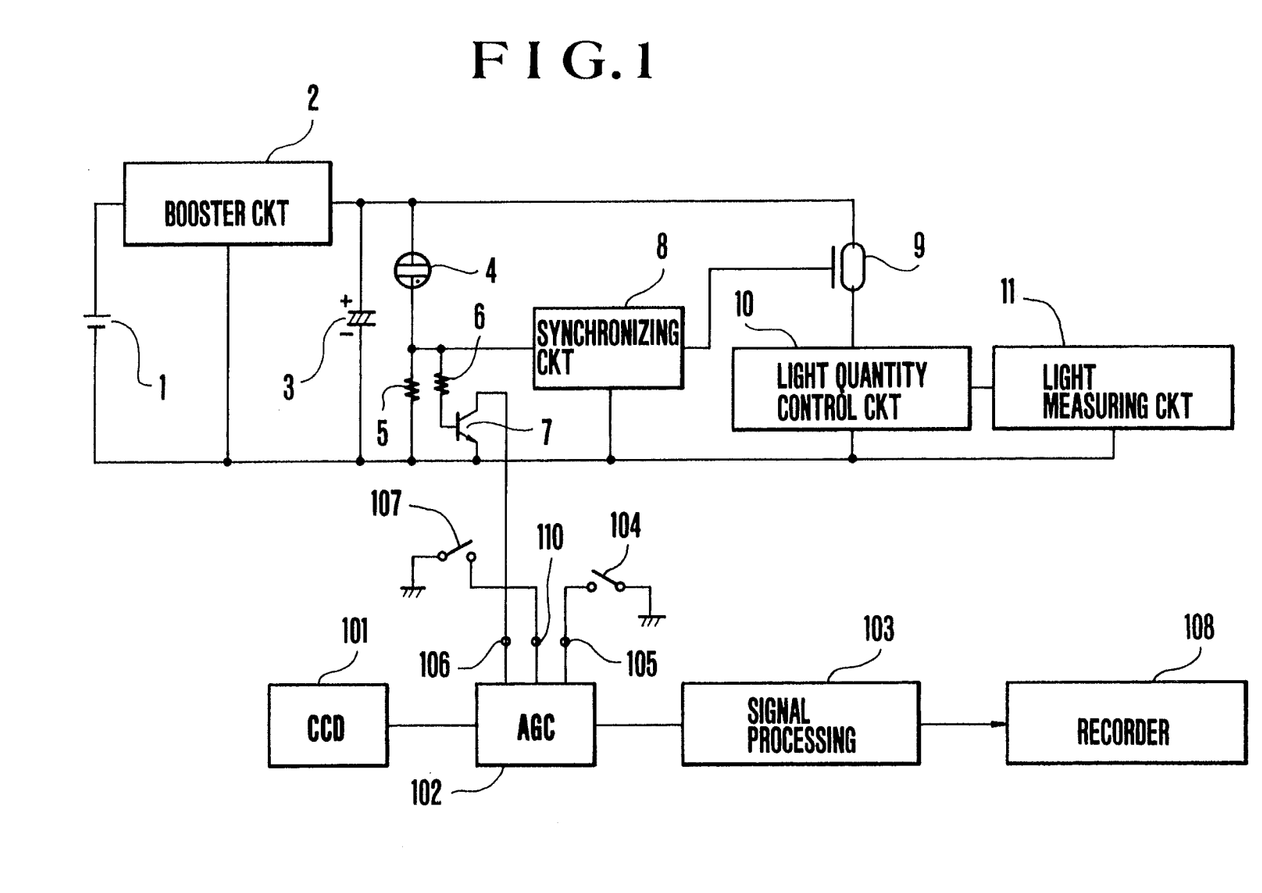
FIG. 1 is a control circuit diagram showing an image sensing device as a first embodiment of the present invention.

In FIG. 1 which shows the control circuit arrangement of a first embodiment of the present invention, the circuit arrangement includes a power source 1; an oscillation booster circuit 2; and a main capacitor 3. A series circuit composed of a neon lamp 4 and a resistor 5 and another series circuit composed of a flash discharge tube 9 and a light quantity control circuit 10 are connected in parallel with the main capacitor 3. The resistor 5 has a series circuit composed of a resistor 6 and the base and emitter of a transistor 7 connected in parallel therewith. The circuit arrangement further includes a synchronizing circuit 8 and a light measuring circuit 11. These elements 1–11 jointly form a known circuit for a flash device. Each of the elements shown in blocks 2, 8, 10 and 11 can be readily arranged in a known manner. Therefore, the details of them are omitted from the description herein. A CCD 101 is employed as image sensor and has the output terminal thereof connected to an AGC 102. The AGC 102 forms a negative feed back loop. The gain of the AGC 102 is arranged to vary with the output level of the image sensor 101 in such a manner that the output of the AGC 102 is controlled to be at about a constant level irrespective of the magnitude of the output of the image sensor 101. The output of the AGC 102 is supplied to the input terminal of a signal processing circuit 103. After that, a recorder 108 performs an image recording operation.

The AGC 102 is provided with three control terminals 105, 106 and 110. The terminal 105 is connected to a grounding potential via a switch 104 which is arranged to turn on in response to an operation on an AE lock button which is not shown but is disposed on an apparatus operation part (not shown). When the terminal 105 is grounded, the gain of the AGC 102 is fixed at a value obtained immediately before the terminal 105 is grounded. The terminal 106 of the AGC 102 is connected to the collector of the transistor 7. When the potential of the terminal 106 drops close to the grounding potential with the transistor 7 or the switch 107 turned on, the gain of the AGC 102 is fixed at a predetermined value irrespective of the value of the gain obtained prior to that. Another control terminal 110 of the AGC 102 is connected to the switch 107 which is interlocked with an exposure correction switch.

Figure 2:
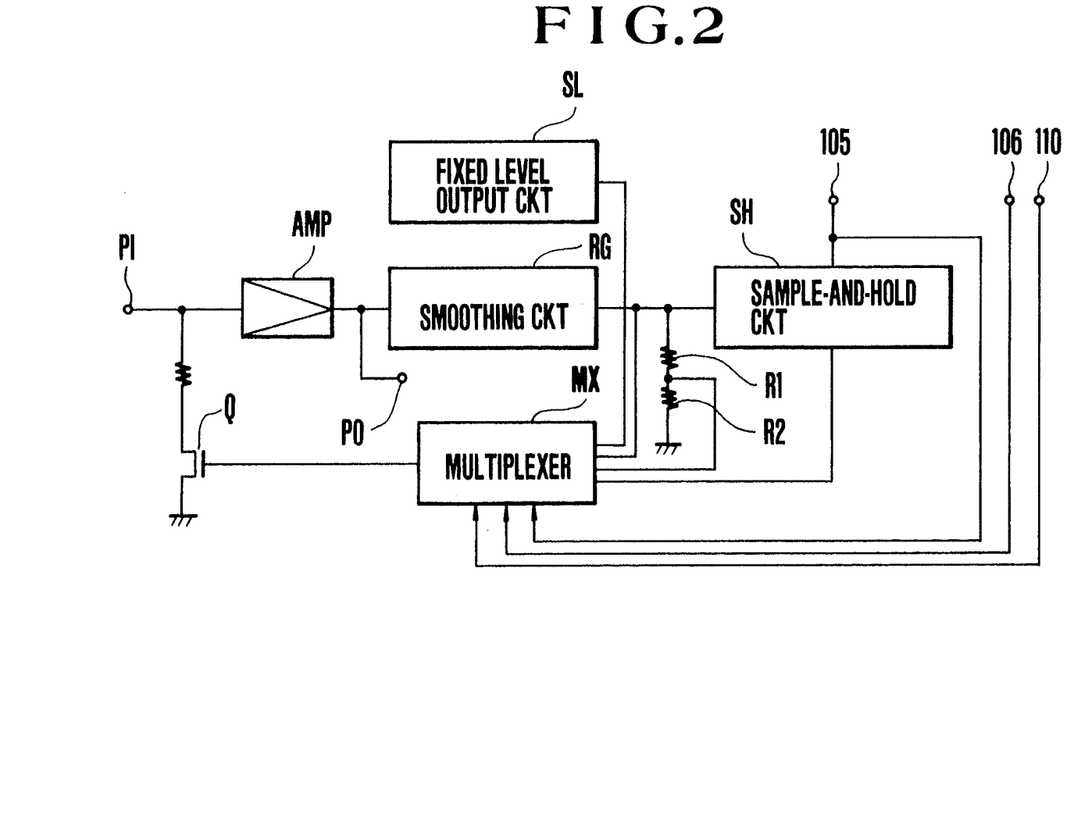
FIG. 2 is a circuit diagram showing the details of an AGC 102 included in the first embodiment shown in FIG. 1.

The details of the AGC 102 of this embodiment are shown in FIG. 2. The AGC is provided with an input terminal PI which is arranged to receive an image sensing signal from the image sensor (CCD) 101; an output terminal P0 which is arranged to supply the output of the AGC 102 to the signal processing circuit 103; an amplifier AMP; a smoothing circuit RG; a sample-and-hold circuit SH; a circuit SL which is arranged to produce a fixed level voltage; a multiplexer MX; an impedance converting FET Q; and voltage dividing resistors R1 and R2.

For normal photography, the multiplexer slects the output of the smoothing circuit RG; transmits a voltage corresponding to the level of the output signal of the CCD to the FET Q; and automatically controls the gain. In other words, AGC operates in a normal manner for normal photography.

When the AE lock button is depressed, the terminal 106 grounded. The sample-and-hold circuit SH holds the output of the smoothing circuit RG obtained at that time. The multiplexer MX transmits the output of the sample-and-hold circuit SH to the FET Q. Accordingly, the closed loop of the AGC is opened and the gain of the AGC is fixed at a value obtained at the time when the AE lock button is depressed. A certain degree of deviation of timing for sampling is allowable as long as the sampling is effected before or after the button is depressed.

In the case of flash photography, the multiplexer MX transmits the output of the fixed level output circuit SL to the FET Q. This opens the closed loop circuit of the AGC, so that the gain of the AGC is fixed at a predetermined value.

Further, at the time of exposure correction, the terminal 110 is grounded. The multiplexer MX transmits to the FET Q a value obtained by dividing the output of the smoothing circuit RG by the predetermined ratio of the resistors R1 and R2.

With the AGC arranged in this manner, the gain of the AGC is shifted a predetermined extent. Further, if a variable resistor is employed as the resistor R2, the extent of the shift, i.e. the degree of exposure correction, becomes adjustable.

The embodiment of the invention which is arranged as described above operates as follows: In the case of an AE lock operation, if one wishes to take a picture of an object such as a back-lighted person, the lens approaches the person and is directed to the person so as not to have the rear-light enter the lens. Under that condition, when the AE lock button is depressed, the switch 104 which is interlocked therewith turns on. With the switch 104 turned on, the control terminal 105 of the AGC is grounded. Accordingly, the gain of the AGC 102 is fixed at a value required for an appropriate exposure for the person. After that, even when the lens is moved away from the person to take the picture of him or her as a part of a larger scene, the exposure remains appropriate to the person thus disregarding the rest of the scene. Meanwhile, since the gain of the AGC 102 remains unvarying, the AGC 102 gives a signal corresponding to the appropriate exposure for the person and thus never hinders the AE lock photography operation.

The operation for flash photography is as follows: With the flash device connected to the image sensing device, when a power source switch (not shown) is turned on, the booster circuit 2 works to charge the main capacitor 3. When the charge voltage of the main capacitor 3 reaches a sufficient value for a flash, the neon lamp lights up. Then, a current flows to the resistor 6. This causes a base current to flow to the transistor 7. The transistor 7 turns on to bring the potential of the control terminal 105 of the AGC to a value close to the grounding potential. As a result of that, the gain of the AGC 102 is fixed at the predetermined value. Meanwhile, a current also flows to the resistor 5. Then, a voltage produced at the two ends of the resistor 5 renders the synchronizing circuit 8 operative. When a photographic operation is performed in this condition, a synchronizing switch (not shown) is turned on. This causes the synchronizing circuit 8 to work so as to trigger the flash discharge tube 9. The tube 9 begins to flash. Reflected light resulting from this flash action is photoelectrically converted and integrated by the light measuring circuit. When the integrated value thus obtained reaches a value corresponding to an appropriate exposure light quantity, the light quantity control circuit 10 operates to stop the flash.

The flash light quantity of the flash device is controlled to make the exposure light quantity appropriate for the object to be photographed. The gain of the AGC 102 is also controlled to become a value suited for that purpose, so that flash photographing also can be accomplished in a satisfactory manner.

Next, in the case of exposure correction, the AE lock arrangement is convenient and permits an accurate photographing operation where the camera can be brought close to the object to be photographed and light measurement can be carried out by covering the whole picture with the image of the object. However, it is sometimes impossible to bring the camera close to the object. In that instance, the gain of the AGC is shifted from a value that gives an appropriate exposure level for the whole picture to a value that is suited for the desired object, so that the exposure thus can be corrected to an appropriate level for the object. For this purpose, the switch 107 is turned on in association with the exposure correction to reduce the potential of the terminal 110 to the grounding level, so that the gain of the AGC 102 can be shifted to a value that gives a correct exposure light quantity. This arrangement thus permits an image sensing operation with a correct exposure for a specific object with the gain changed from a value suited for the whole scene to be photographed.

As will be understood from the foregoing description, the AGC is controlled according to the photographing mode employed to permit appropriate photographing in each of the AE lock, flash and exposure corrected photographing modes.

Figure 3:
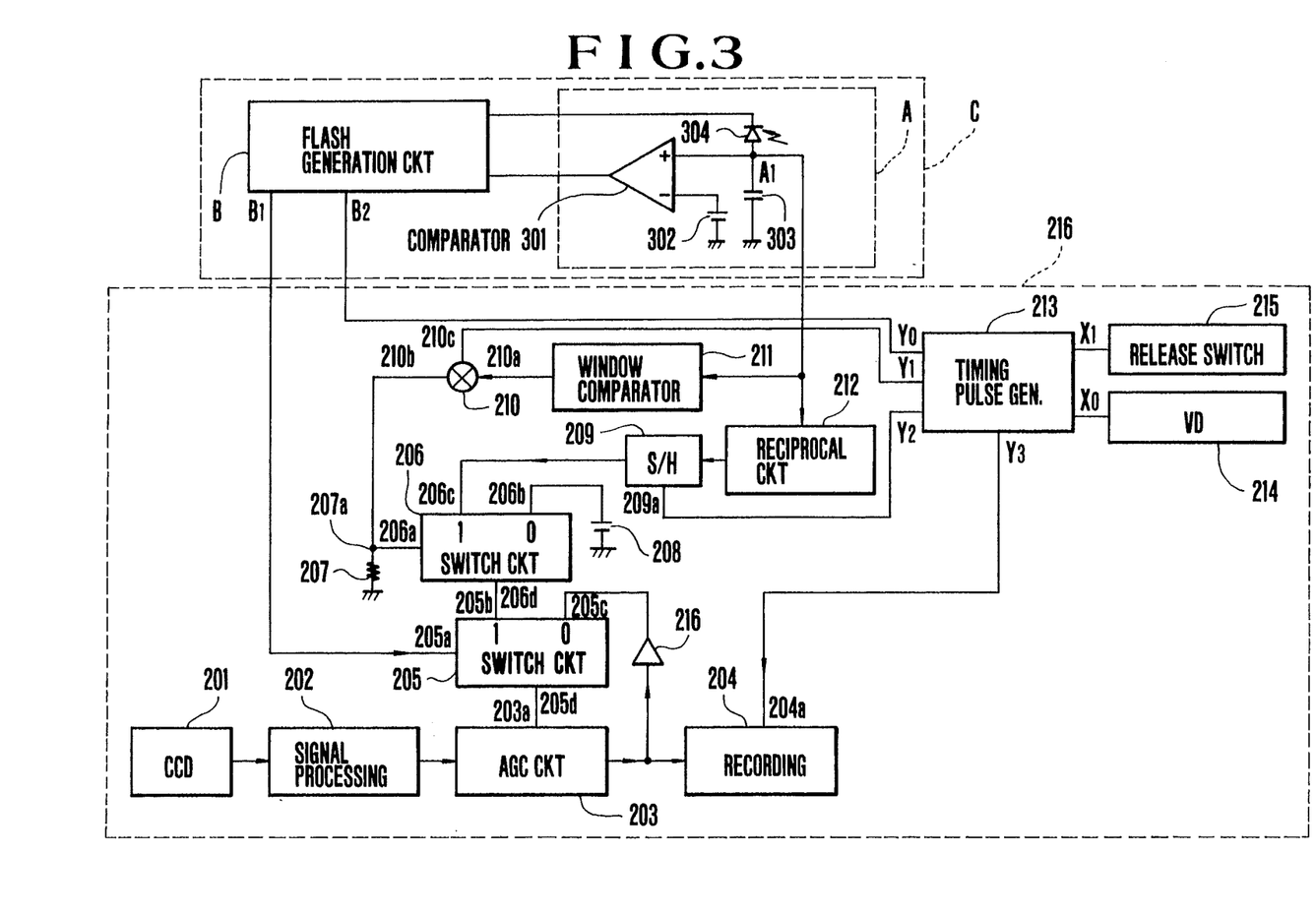
FIG. 3 is a circuit diagram showing the control circuit arrangement of an image sensing device as a second embodiment of the invention.
Figure 4:
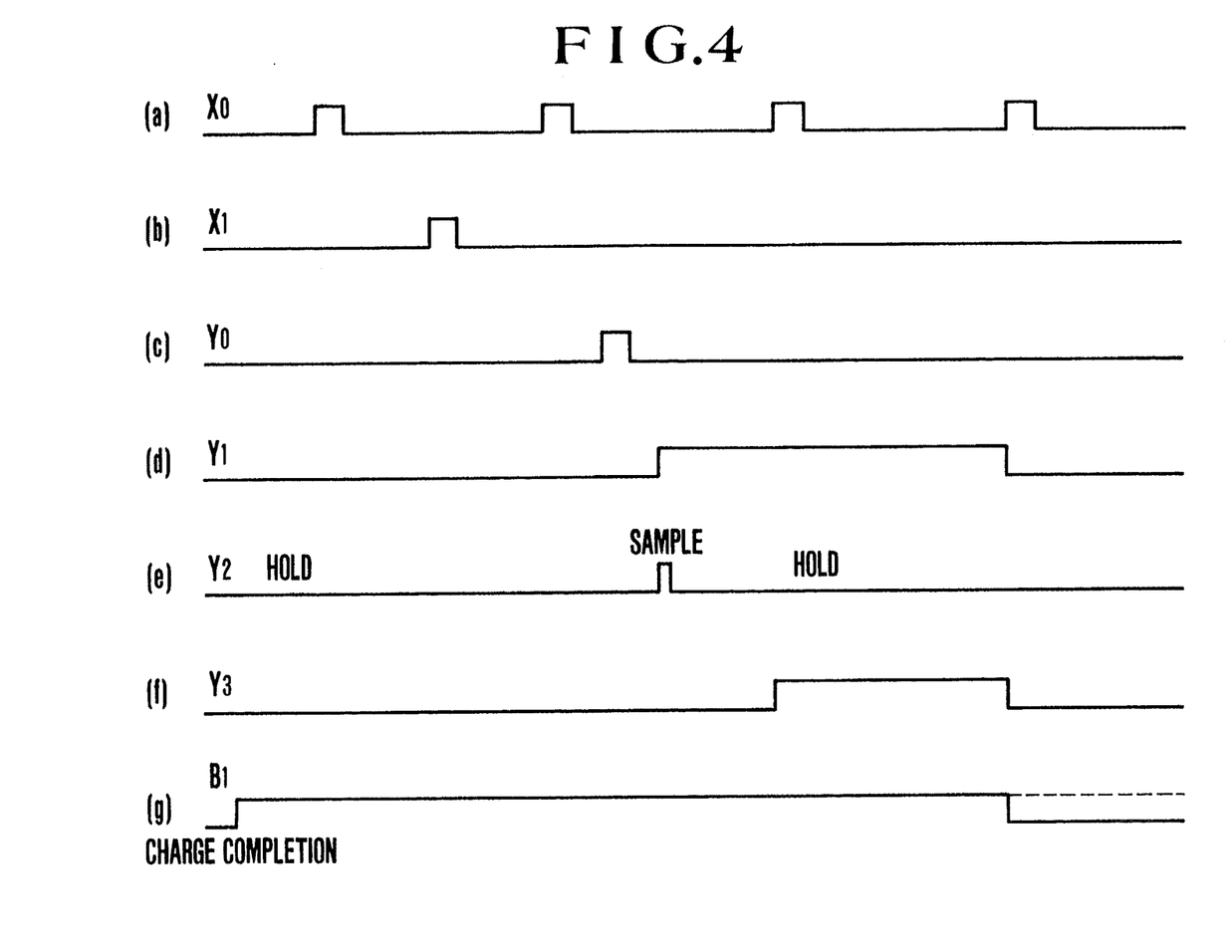
FIG. 4 is a wave form chart showing signals produced from various components of the embodiment shown in FIG. 3.

Referring now to FIGS. 3 and 4, a second embodiment of the invention is arranged as follows: FIG. 3 shows the control circuit arrangement of the image sensing device embodying the invention as the second embodiment. The embodiment includes an image sensor 201 which is a CCD, an X-Y address type MOS image sensor, a camera tube or some other image sensing means. The image sensor 201 converts the image of an object to be photographed into an electrical signal. The output of the image sensor 201 is transmitted to an automatic gain control (AGC) circuit 203 via a signal processing circuit 202. The output of the AGC circuit 203 is supplied to a recording circuit 204. The gain control terminal 203a of the AGC circuit 203 is connected to one terminal 205d of a switch circuit 205. Switch circuits 205 and 206 are arranged as follows: They become conductive between terminals 205b and 205d and between 206c and 206d when their control terminals 205a and 206a are at high levels. When the control terminals 205a and 206a are at low levels, they become conductive between terminals 205c and 205d and between terminals 206b and 206d. The terminal 205a of the switch circuit 205 is connected to the charge completion terminal B1 of a flash light generation circuit B. The terminal 205b of the switch circuit 205 is connected to the terminal 206d of the switch circuit 206. Another terminal 205c is connected to the output terminal of the AGC circuit 203 via an inversion amplifier 216. The control terminal 206a of the switch circuit 206 is connected to a connection point 207a between a resistor 207 and an analog gate 210. The terminal 206b is connected to a reference voltage source 208. The terminal 206c is connected to the output terminal of a sample-and-hold circuit 209.

The sample-and-hold circuit 209 is arranged to sample an input voltage when the control terminal 209a thereof is at a high level and, when the terminal 209a is at a low level, to hold a sampled value obtained immediately before the level of the control terminal 209a becomes the low level. The control terminal 209a of the sample-and-hold circuit 209 is connected to a timing pulse generator 213 while the input terminal thereof is connected to a reciprocal circuit 212. When the control circuit 210c of an analog switch 210 is at a high level, the analog switch is conductive between terminals 210a and 210b and becomes non-conductive when the level of the control terminal 210 is low. To the control terminal 210c is supplied a pulse output produced from the timing pulse generator 213. To the time pulse generator 213 are connected the output terminal of a vertical synchronizing signal forming circuit 214 and that of a release switch 215. The output terminal of the timing pulse generator 213 is connected to the synchronizing terminal B2 of the flash light generation circuit (or device) B and the recording control terminal 204a of the recording circuit 204, etc.

A part A of the circuit arrangement encompassed with a broken line represents a light measuring circuit which detects a reflection light resulting from flashing. The light measuring circuit A comprises a comparator 301, a reference voltage source 302, an integrating capacitor 303 and a light sensitive element 304. This light measuring circuit A is disposed within the housing C of the flash light generation device B. The housing C is arranged to be attachable to and detachable from the image sensing device 216. A connection point A1 between the light sensitive element 304 and the integrating capacitor 303 is connected to the input terminals of a window comparator 211 and the reciprocal circuit 212. After the electric charge level of the main capacitor (not shown) disposed within the flash light generation circuit B has exceeded a predetermined level, i.e. after completion of a charging process for the main capacitor, the level of the terminal B1 of the circuit B becomes high. Further, the main capacitor is arranged to accumulate an energy required for allowing a flash light source (not shown) disposed within the flashlight generation circuit B to flash.

Meanwhile, the window comparator 211, the reciprocal circuit 212, the sample-and-hold circuit 209, the analog switch 210, the switch circuit 206, etc. jointly form the correction means which relates to the present invention.

The operation of the second embodiment which is arranged in this manner is as shown in FIG. 4. At the stage when a power source switch (not shown) of the image sensing device is turned on, the terminal B1 is at a low level and the level of the control terminal 205a of the switch circuit 205 is also low. Therefore, the switch circuit 205 is conductive between its terminals 205c and 205d at that stage. Accordingly, the output of the AGC circuit 203 is fed back via the inversion amplifier 216 to the gain control terminal 203a of the AGC circuit 203. Under this condition, the gain of the AGC circuit is controlled to have the output level of the CCD (or the image sensor) 201 unvarying.

Next, when the power source (not shown) disposed within the flash light generation circuit B is turned on, the main capacitor begins to be charged within the flash light generation circuit B. When the electric charge energy of the main capacitor becomes sufficient for flashing, a display element (not shown) makes a display to indicate completion of a charging process. Concurrently with that, the level of the terminal B1 becomes high. Accordingly, the switch circuit 205 becomes conductive between its terminals 205b and 205d.

After completion of the charging process on the main capacitor, when the release switch 215 is turned on, a release signal X1 is formed as shown by FIG. 4(b). Then, a synchronizing signal is produced from the output terminal Y0 of the timing pulse generator 213 at a suitable timing within a field period following the field released by the operation of the timing pulse generator 213 (see FIG. 4(c)). However, in the case where the image sensor is a camera tube or an X-Y address type image sensor, this synchronizing signal is arranged to be produced within a vertical blanking period after the release. The synchronizing signal produced from the terminal Y0 is supplied to the input terminal B2 of the flash light generation circuit B to cause thereby the flash light source to flash. An object which is illuminated with the flash light thus emitted reflects the light. The reflection light thus obtained is photo-to-electric converted by the light sensitive element 304 into an electrical signal. The integrating capacitor 303 is charged with this electrical signal. The charge voltage of the integrating capacitor gradually increases according to the quantity of the reflection light. When the charge voltage of the capacitor becomes higher than the voltage of the reference voltage source 302, the output level of the comparator 301 changes from a low level to a high level. The high level output of the comparator 301 then brings the flash light emission by the flash light source to a stop within the flash light generation circuit B.

After the lapse of a length of time considered sufficient for flashing by the flash light source (for example, after the lapse of several milli-sec), a positive pulse which is long enough to cover a period up to a next field portion is produced from a terminal Y1 of the timing pulse generator 213 as shown in FIG. 4(d).

Further, concurrently with the pulse Y1, a sampling pulse Y2 which has a very short rising pulse width is produced as shown in FIG. 4(e).

In case that the illumination by the flash light source is appropriate and the photo-to-electric converted, integrated value of the reflection light from the object is approximately equal to the voltage of the reference voltage source 302, that is, when light control is apposite, the output level of the window comparator 211 is low. The low level signal produced from the comparator 211 is guided to the ground via the analog switch 210 and the resistor 207 while the pulse Y1 remains at a high level. Accordingly, the level of the connection point 207a becomes low and the switch circuit 206 is conductive between its terminals 206b and 206d. Therefore, a predetermined voltage is supplied from the reference voltage source 208 to the gain control terminal 203a of the AGC circuit 203 to have the AGC circuit 203 operate in a prescribed fixed gain mode.

In cases where the quantity of the flash light is insufficient for a distance to the object or for the reflection factor of the object or where the flash light generation circuit fails to appositely control the flash light quantity thus resulting in an excessive difference between the photoelectric converted, integrated value of the reflection light from the object and the voltage value of the reference voltage source 302, the output level of the window comparator 211 becomes high. Then, during the period while the pulse Y1 stays at a high level, the high level output of the comparator 211 is guided to the ground via the analog switch 210 and the resistor 207. The level of the control terminal 206a of the switch circuit 206 then becomes high. The switch circuit 206, therefore, becomes conductive between its terminals 206c and 206d. As a result, the output of the sample-and-hold circuit 209 is supplied to the gain control terminal 203a of the AGC circuit 203. At the output terminal of the sample-and-hold circuit 209 is held a voltage which is proportional to the reciprocal number of the charge voltage obtained at the integrating capacitor 303 immediately after completion of flashing.

Therefore, the output voltage of the sample-and-hold circuit 209 is low when the quantity of the reflection light from the object is excessive, i.e. when the level of the charge voltage of the integrating capacitor 303 is much higher than the voltage of the reference voltage source 302.

In that instance, the gain of the AGC circuit 203 is small. Conversely, when the quantity of the reflection light from the object is small, the gain of the AGC becomes large. Therefore, in case that the quantity of the reflection light resulting from illumination with the flash light is excessively higher than the value required by the image sensor, the AGC circuit 203 also operates to electrically correct the gain.

The AGC (gain control) circuit thus produces a gain adjusted signal. The gain adjusted signal is then recorded by the recording circuit 204 by supplying to the recording circuit 204 a timing pulse Y3 which is produced from the timing pulse generator 213 as shown in FIG. 4(f).

In the case of the embodiment shown in FIG. 3, the light measuring circuit A is disposed within the housing of the flash light generation circuit B. However, this light measuring circuit A may be disposed within the image sensing device in case of TTL (through-the-lens) light control. Further, in this embodiment, a flash light such as a flash device light or a flash bulb light is considered to be used as an illumination light. However, the present invention is of course applicable to all cases where at least one picture portion of an object image signal is to be formed and recorded immediately after commencement of the illumination. In that case, the illumination light to be used should have a high building-up speed. Such a light may be allowed to remain illuminating for a while after light emission.

The second embodiment thus comprises the image sensing means which converts the image of an object into an electrical signal; an automatic gain control circuit which automatically controls the gain of the electrical signal; the switching means for changing the gain of the electrical signal to a predetermined value in the case of flash photography; and the correction means for correcting the above-stated gain according to the quantity of the reflection light resulting from flashing. Therefore, in cases where the image of an object is to be sensed by momentarily illuminating the object, the invented arrangement not only covers the insufficiency of the automatic gain control circuit but also is capable of readily correcting an inapposite exposure for flash photography. In other words, in case that flash light quantity is to be controlled by a light control circuit, flashing must be brought to an end immediately after commencement of flashing for an extremely near object or for an object of high reflection factor. However, this cannot be always accurately carried out due to the responsivity of the light control circuit and thus sometimes results in an erroneous exposure. Whereas, in accordance with the invention, an apposite signal level can be obtained even in such instances and, accordingly, a wide dynamic range is obtainable. Further, the arrangement to provide within the flash light generation circuit the means for producing information on the flash reflection light quantity to the image sensing device makes the gain of the automatic gain control (AGC) circuit controllable.

Further, flash photographing and AE lock photographing are performed mainly for taking a still picture. Meanwhile, the exposure corrected photographing can be effectively performed for both a motion picture and a still picture.

In the second embodiment, the flash light generation circuit or device C is arranged separately from the image sensing device 216. However, in accordance with the invention, the flash light generation device of course can be arranged within the image sensing device.

While preferred embodiments have been described, variations thereto will occur to those skilled in the art within the scope of the present inventive concepts delineated by the following claims.

What I claim:

1. An image sensing device comprising:
   image sensing means which converts the image of an object to be photographed into an electrical signal;
   means for selecting one of a plurality of photographing modes;
   an automatic gain control circuit which automatically controls the gain of said electrical signal; and
   limiting means for limiting an operation of said automatic gain control circuit according to a photographing mode selected by the selecting means, said limiting means limiting the gain of said automatic gain control circuit to a predetermined value in a flash photographing mode.

2. A device according to claim 1, further including correction instructing means for applying an instruction to said limiting means when an exposure correction photographing mode is selected, said limiting means shifting automatically said gain in response to the instruction of said correction instructing means.

3. A device according to claim 1, wherein said limiting means includes:
a) fix means for fixing said gain of said automatic gain control in response to a fixed signal; and
b) means for generating said fixed signal according to said flash photographing mode.

4. An image sensing device comprising:
image sensing means which converts the image of an object to be photographed into an electrical signal;
an automatic gain control circuit which automatically controls the gain of said electrical signal; and
setting means for setting the gain of said automatic gain control circuit at a predetermined value in the case of a flash photography mode.

5. A device according to claim 4, further comprising means for selecting one of a plurality of photography modes; wherein said automatic gain control circuit has a negative feed back loop; and said setting means opens said negative feed back loop in response to said selecting means selecting said flash photography mode.

6. A device according to claim 4, further comprising means for selecting one of a plurality of photography modes; means for generating a signal corresponding to a quantity of reflection light resulting from flashing in said flash photography mode; and correcting means for correcting said gain according to said signal of said generating means.

7. A device according to claim 6, wherein said correcting means comprises means for decreasing said gain as said signal of said generating means corresponds to an increase in the quantity of said reflection light, and for increasing said gain as said signal corresponds to a decrease in the quantity of the reflection light.

8. A device according to claim 4, wherein, when said device is coupled to a flash light generating device having a charging process and which generates a signal upon completion of the charging process, said setting means sets said gain at the predetermined value in response to said signal representative of completion of the charging process of the flash light generating device.

9. A device according to claim 8, wherein said image sensing device is a discrete unit separable from said flash light generating device.

10. An image sensing device comprising:
image sensing means which converts the image of an object to be photographed into an electrical signal;
an automatic gain control circuit which automatically controls the gain of said electrical signal;
storage instructing means for instructing storing a signal for controlling the gain of said gain control circuit, said controlling signal relating to information on an exposure; and
storage means which stores said controlling signal to control the gain of said gain control circuit in response to instruction of said storage instruction means, said storage means being composed of a sample-and-hold circuit, and said sample-and-hold circuit samples said controlling signal in response to the instruction of said storage instructing means, and said sample-and-hold circuit holds value of the sampled controlling signal.

11. An image sensing device comprising:
image sensing means which converts the image of an object to be photographed into an electrical signal;
an automatic gain control circuit which automatically controls the gain of said electrical signal;
correction instructing means for instructing correction of an exposure: and
holding means for holding said gain at a predetermined value when the exposure is fixed at a predetermined value by said instructing means, wherein said automatic gain control circuit has a negative feed back loop; and said holding means holds a signal of said negative feed back loop.

12. An image sensing device adapted for use in combination with flash device, said flash device having a charging process and generates a signal upon completion of this charging process, said image sensing device comprising:
image sensing means which converts the image of an object to be photographed into an electrical signal;
an automatic gain control circuit which automatically controls the gain of said electrical signal; and
setting means for setting the gain of said automatic gain control circuit at a predetermined value in response to said signal representative of completion of the charging process of said flash device.

13. A device according to claim 12, further including means for generating a signal corresponding to a quantity of reflection light resulting from flashing in a flash photography mode; and correction means for correcting said gain according to said signal of said generating means.

14. A device according to claim 13, wherein said correcting means comprises means for decreasing said gain as said signal of said generating means corresponds to an increase in the quantity of said reflection light, and for increasing said gain as said signal of said generating means corresponds to a decrease in the quantity of the reflection light.

15. A device according to claim 12, wherein said flash device is a discrete unit separable from said image sensing device.

16. An image signal apparatus comprising:
a) image sensing means for converting an image into an electrical signal;
b) means for amplifying said electrical signal converted by said image sensing means, said amplifying means including an automatic gain control circuit;
c) means for selecting one of a plurality of image sensing modes; and
d) means for controlling an amplifying operation of said amplifying means in response to a selection of said selecting means, said selecting means selecting at least one of a flash using image sensing mode and a normal sensing mode.

17. An apparatus according to claim 16, wherein said image sensing means comprises CCD.

18. An apparatus according to claim 16, wherein said automatic gain control circuit includes a negative feedback loop.

19. An apparatus according to claim 16, wherein said control means controlling the gain of said amplifying operation of said amplifying means to be at a specific value which is proper for the flash using image sensing mode when the flash using image sensing mode is selected by said selecting means.

20. An apparatus according to claim 16, wherein said selecting means selects at least one of an exposure correcting mode and a normal sensing mode.

21. An apparatus according to claim 20, wherein said controlling means shifts the gain of said of said amplifying means when the exposure correcting mode is selected by said selecting means.

22. An apparatus according to claim 16, wherein said selecting means selects at least one of an exposure lock mode and a normal sensing mode.

23. An apparatus according to claim 22, further comprising:
means for storing a signal for indicating the gain of said amplifying means, wherein said controlling means fixes the gain of said amplifying means in accordance to said signal stored in said storing means when the exposure lock mode is selected by said selecting means.

24. An image sensing apparatus comprising:
a) image sensing means for converting an image into an electrical signal;
b) means for selecting one of at least flash using mode and flash unusing mode;
c) means for amplifying said electrical signal converted by said image sensing means, said amplifying means including an automatic gain control circuit; and
d) means for setting the gain of an amplifying operation of said amplifying means at a specific value which is proper for the flash using mode in the case of the flash using mode.

25. An apparatus according to claim 24, wherein said amplifying means includes a negative feedback loop, and said setting means sets said gain to said specific value by opening said negative feedback loop.

26. An apparatus according to claim 24, wherein said apparatus is coupled with a flash light device having a charging process and which generates a charge complete signal upon completion of the charging process, and said selecting means selects said flash using mode in response to said charge complete signal.

27. An image sensing apparatus comprising:
a) image sensing means for converting an image into an electrical signal;
b) means for amplifying said electrical signal converted by said image sensing means;
c) storage instructing means for instructing storing a signal for controlling an amplifying operation of said amplifying means; and
d) storage means for storing said controlling signal to control said amplifying means in response to an instruction by said storage instructing means, said storage means including a sample-and-hold circuit for holding said controlling signal in response to said instruction by said storage instruction means.

28. An image sensing apparatus according to claim 27, wherein said storage instruction means includes:
a manually operation means which instructs storing said controlling signal.

29. An image sensing device comprising:
(a) image sensing means which converts an image to be photographed into an electrical signal;
(b) flash lighting means for lighting an object;
(c) measuring means for measuring an amount of light reflected by said object after flashing of said flash lighting means;
(d) first control means for controlling a period of flashing of said flash lighting means in response to an output of said measuring means; and
(e) gain control means for controlling a gain of the image sensing means in response to the output of said measuring means.

30. An image sensing device according to claim 29, wherein said gain control means is arranged to set said gain at a predetermined fixed value when said output of the measuring means is at a predetermined value.

31. An image sensing device according to claim 29, wherein said gain control means is arranged to variably control said gain in response to a state of the output of the measuring means when said output of the measuring means is not at a predetermined value.

* * * * *